A. J. MOTTLAU.
MECHANICAL MOVEMENT.
APPLICATION FILED AUG. 5, 1914.
1,195,384.
Patented Aug. 22, 1916.
3 SHEETS—SHEET 1.
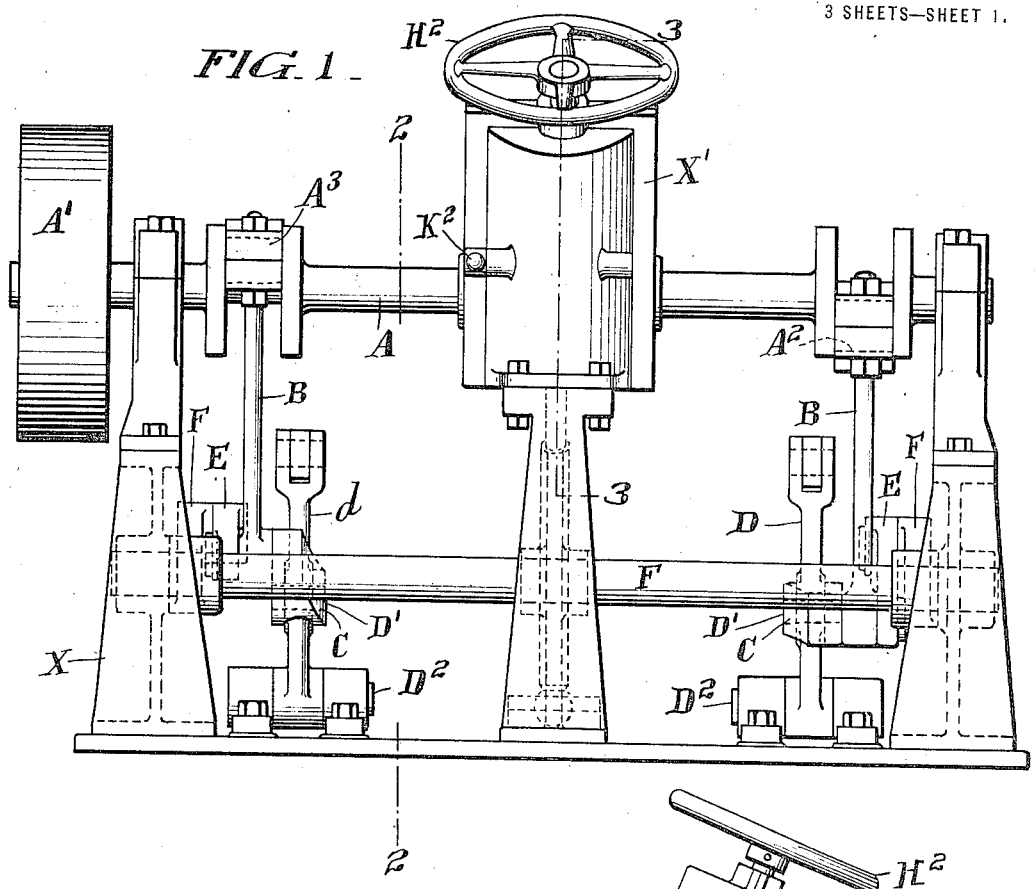
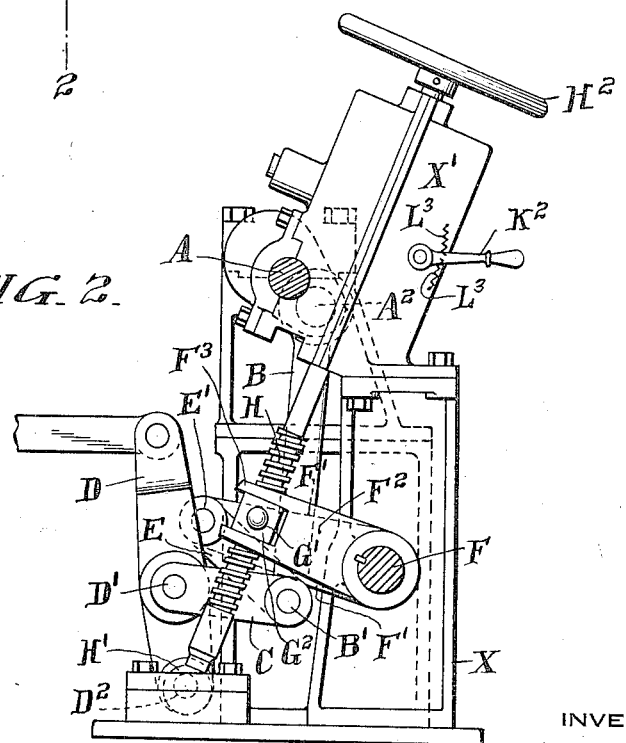

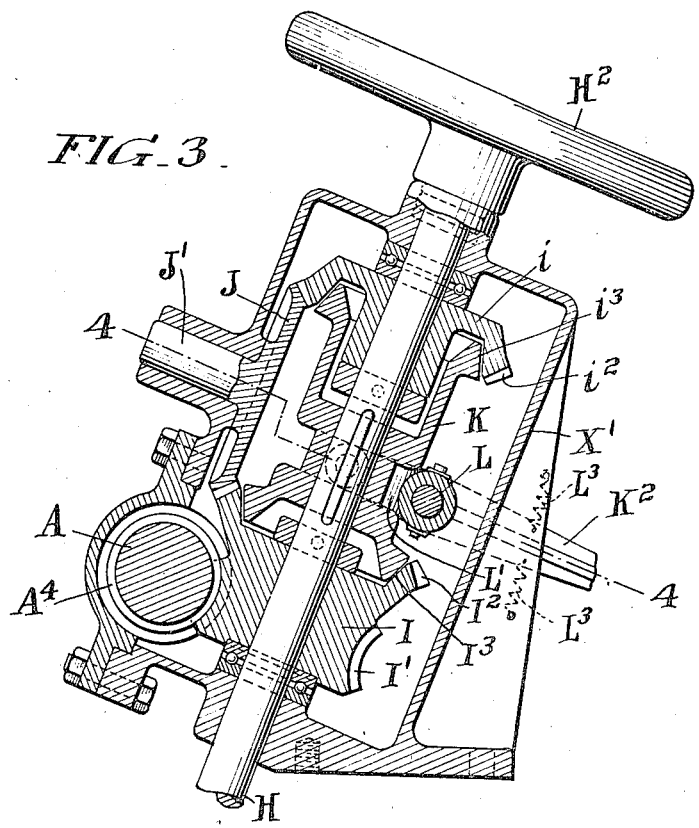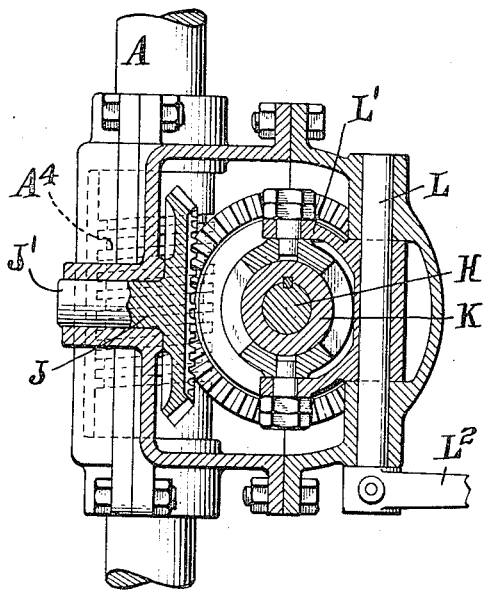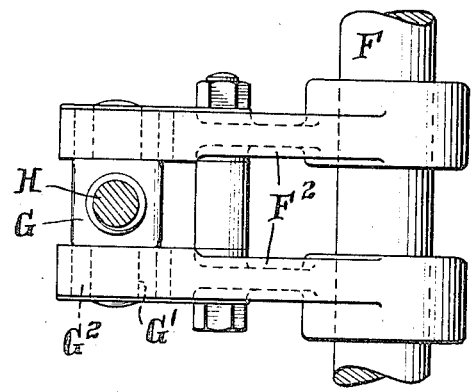

A. J. MOTTLAU.
MECHANICAL MOVEMENT.
APPLICATION FILED AUG. 5, 1914.

1,195,384.

Patented Aug. 22, 1916.
3 SHEETS—SHEET 3.

WITNESSES

INVENTOR
August J. Mottlau
BY
his ATTORNEY

UNITED STATES PATENT OFFICE.

AUGUST J. MOTTLAU, OF PHILADELPHIA, PENNSYLVANIA, ASSIGNOR TO MOTTLAU TRANSMISSION INCORPORATED, OF NEW YORK, N. Y., A CORPORATION OF NEW YORK.

MECHANICAL MOVEMENT.

1,195,384.   Specification of Letters Patent.   Patented Aug. 22, 1916.

Application filed August 5, 1914. Serial No. 855,124.

*To all whom it may concern:*

Be it known that I, AUGUST J. MOTTLAU, a citizen of the United States, residing in the city and county of Philadelphia, in the State of Pennsylvania, have invented certain new and useful Improvements in Mechanical Movements, of which the following is a true and exact description, reference being had to the accompanying drawings, which form a part thereof.

The primary object of my present invention is to provide simple and effective means for transmitting movement from one part to another, which will permit the amplitude of the relative movements of the two parts to be readily varied.

While not absolutely limited to such use, my invention is primarily devised for use in converting a periodic movement of one part into a periodic movement of varying amplitude of another part; and by the term "periodic movement" I mean to include to and fro movements in straight and curved paths, and also circular movement.

The invention is especially adapted for use in converting the circular movement of a crank pin into an oscillatory or reciprocatory movement of varying amplitude.

The various features of novelty characterizing my invention are pointed out with particularity in the claims annexed to and forming a part of this specification. For a better understanding of the invention, however, and of the advantages possessed by it, reference should be had to the accompanying drawings and descriptive matter, in which I have illustrated and described forms in which my invention may be embodied.

Figure 6:
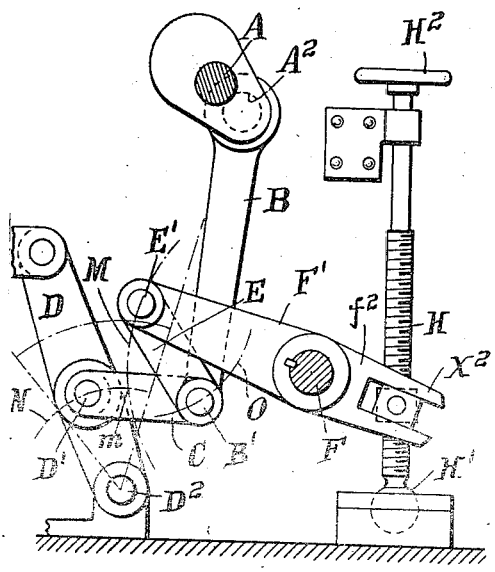
Figure 7:
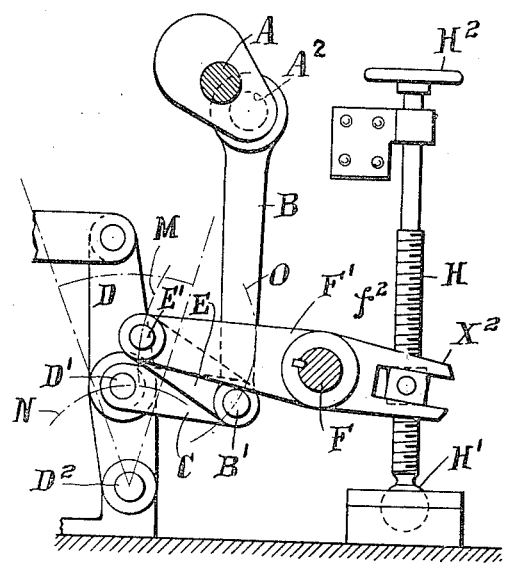
Figure 8:
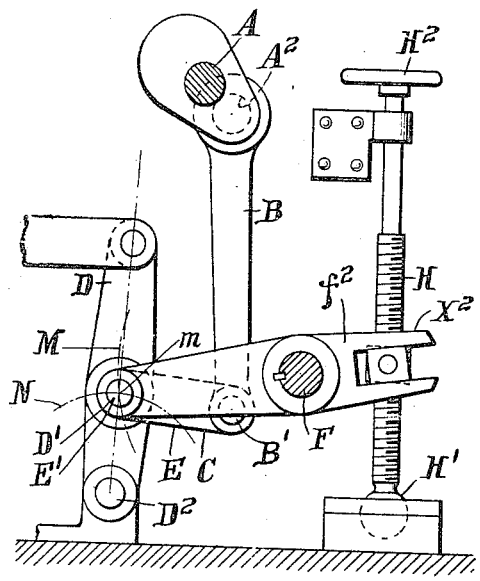
Figure 9:
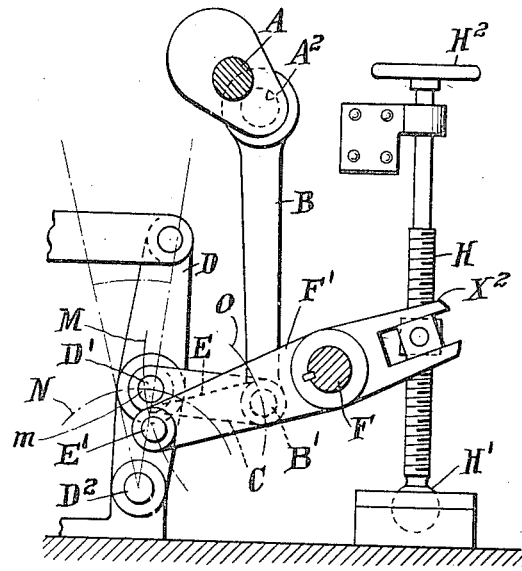

Of the drawings: Figure 1 is an elevation of one form of apparatus embodying my invention; Fig. 2 is a section taken on the line 2—2 of Fig. 1; Fig. 3 is a partial sectional elevation on the line 3—3 of Fig. 1; Fig. 4 is a section on the line 4—4 of Fig. 3; Fig. 5 is a plan view of a portion of the apparatus shown in Figs. 1 and 2; Fig. 6 is a somewhat diagrammatic representation of a slightly modified form of the apparatus shown in Figs. 1 and 2; and Figs. 7, 8 and 9 are views taken similarly to Fig. 6, and showing the same apparatus, but in different adjustments.

The mechanism shown in Figs. 1 to 5, inclusive, comprises a stationary framework X, in which is journaled a rotating shaft A. The shaft A carries a pulley A' at one end, by means of which it may receive or transmit power. As shown, the shaft A is formed with crank portions adjacent its ends, the two crank pins $A^2$ and $A^3$ being set at an angle of about 90 degrees to one another.

A connecting rod B, journaled at its upper end on the crank pin $A^2$, is pivotally connected at its lower end by a pivot pin B' to one end of each of two links C and E. The effective lengths of the links C and E, that is, the distance between the centers of the pivotal connections at the opposite ends of the link, is the same in each case. The opposite end of the link C is pivotally connected by the pivot pin D' to a lever D. The lever D is pivotally connected to the framework X by the fulcrum pin $D^2$. The end of the link E remote from the pivot pin B' is connected by the pivot pin E' to the arm F' of a rock shaft F. The latter is normally stationary, but may be angularly adjusted.

The means shown for angularly adjusting the shaft F comprises arms $F^2$ secured to the shaft F and provided with slideways $F^3$ receiving slide blocks $G^2$ in which are journaled the trunnion extensions G' of a nut G working on the screw spindle H. The latter is journaled at its lower end in the framework X, as by means of the ball and socket connection indicated at H'. Adjacent its upper end, the shaft H is journaled in the framework portion X' which forms a housing for the gearing by which the shaft H may be rotated in either direction from the shaft A. This mechanism comprises a gear wheel I loosely mounted on the shaft H and having gear teeth I' in mesh with the worm $A^4$ on the shaft A, and having bevel gear teeth $I^2$ in mesh with a bevel gear idler J, the supporting shaft J' of which extends transversely to the shaft H and also to the shaft A and is journaled in the housing X'. The gear J also meshes with the teeth $i^2$ of the bevel gear $i$, also loosely mounted on the shaft H.

The gears I and $i$ are formed in their adjacent ends with conical friction surfaces $I^3$ and $i^3$, respectively, adapted to be operatively connected by the corresponding end of a friction clutch member K, splined on the shaft H and axially movable thereon by means of a rock shaft L having arms L' engaging the member K and having an external operating arm K². Springs L³ normally hold the shaft L in a neutral position, in which the clutch member K is out of operative engagement with both gears I and i, but when the clutch member K is shifted into engagement with either of the gears I or i, the shaft H is rotated by the shaft A in one direction or the other, according to which of the gears I or i is engaged by the member K. A hand wheel H², secured to the upper end of the shaft H, permits of the manual rotation of the shaft H, regardless of whether or not the shaft A is in rotation.

A lever d is mounted, and is connected to the crank pin A³, as the lever D is mounted, and is connected to the pin A². It will be understood, of course, the levers D and d with their operating connections are duplicates; and that this duplication is not essential, for each operates entirely independent of the other.

The manner in which the circular movement of the crank pin A² is caused to impart oscillatory movement of varying amplitude to the lever D will be readily understood from Figs. 6 to 9 inclusive, which show the positions occupied in different adjustments of a mechanism essentially the same as that shown in Figs. 1 to 5, except that in Figs. 6 to 9 the shaft H is arranged to operate on the shaft F through arms f² at the opposite side of the shaft F and arm F′, and in Figs. 6 to 9 the only means shown for rotating the shaft H is the hand wheel H².

By referring to Fig. 6, it will be seen that the path of the movement of the axis of the pivotal connection E′, as the shaft F is angularly adjusted is an arc M, intersecting the arc of movement N of the axis of the pin D′ about the horizontal connection D², at the point m. With the axis of the pivotal connection E′ on the convex side of the arc N, as shown in Figs. 6 and 7, the circular movement of the crank pin A² will cause the pivotal connection B′ to move along a corresponding arc O, and this will cause the pivotal connection D′ to move back and forth along the arc N. The amplitude of angular movement of the pivotal connection D′ and of lever D increases with the distance of the axis of the pivotal connection E′ from the arc N, as is obvious from a comparison of Figs. 6 and 7. When adjusted to the condition shown in Fig. 8, in which the axis of the pivotal connection E′ intersects the arc M, the oscillatory movement of the pivotal connection E′ produced by the crank pin A² and connecting rod B, will not produce any movement at all of the pivotal connection E′ or of the lever D. When the pivotal connection E′ is carried to the inner or concave side of the arc N, as shown in Fig. 9, the amplitude of movement of the lever D again corresponds to the distance of the axis of the pivotal connection E′ from the arc N, but the motion of the lever D is reversed or shifted 180 degrees in phase, so to speak, from that which it was originally; i. e., the movement of the connecting rod B in a direction to cause the lever D to swing to the left, when the pivot pin E′ is on the convex side of the arc N, will cause the lever D to move to the right when the pivot pin E′ is on the concave side of the arc N.

It will be understood, of course, that the movements imparted to the lever d by the shaft A will differ in phase only from those imparted to the lever D as the shaft F is angularly adjusted.

It will be apparent to those skilled in the art that the mechanism disclosed is capable of use for many widely different purposes, and that changes may be made in the forms of mechanism disclosed without departing from the spirit of the invention claimed herein.

Having now described my invention, what I claim as new and desire to secure by Letters Patent, is:

1. In a mechanical movement, the combination of a reciprocating member, an adjustable element, a pair of links pivotally connected one to the first mentioned member and the other to the second mentioned member and each to the other with the axis of the common pivotal connection of the two links at the same distance from the axes of the other two pivotal connections to the links, and a power transmitting connection to the connected ends of said links, said element being adjustable to move the axis of its pivotal connection to one of said links transversely to the path of movement of the axis of the pivotal connection of the other link to said member.

2. In a mechanical movement, the combination of a reciprocating member, an adjustable element, a pair of links pivotally connected one to the first mentioned member and the other to the second mentioned member and each to the other with the axis of the common pivotal connection of the two links at the same distance from the axes of the other two pivotal connections to the links, a power transmitting connection to the connected ends of said links and means for holding said elements in different adjustments in which the axis of the pivotal connection thereto of one of said links is at different sides of, and at different distances from the path of movement of the axis of the pivotal connection of the other link to said member.

3. In a mechanical movement, a crank shaft, a rocking element, a reciprocating member, a pair of links pivotally connected one to said rocking element and the other to said member and each to the other with the axis of the common pivotal connection of the two links at the same distance from the axes of the other two pivotal connections to the links, a connecting rod connecting the connected ends of the two links to the crank shaft, said rocking element being adapted when oscillated to move the axis of its pivotal connection to one of said links transversely to the path of movement of the pivotal connection between the other link and said member as the latter reciprocates, and means for oscillating said rocking element.

4. In a mechanical movement, a crank shaft, an adjustable element, a reciprocating member, a pair of links pivotally connected one to said element and the other to said member and each to the other with the axis of the common pivotal connection of the two links at the same distance from the axes of the other two pivotal connections to the links, a connecting rod connecting the connected ends of the two links to the crank shaft, and means for adjusting said element to move the axis of its pivotal connection to one of said links transversely to the path of movement of the pivotal connection between the other link and said member as the latter reciprocates.

5. In a mechanical movement, a crank shaft, an adjustable element, a reciprocating member, a pair of links pivotally connected one to said element and the other to said member and each to the other with the axis of the common pivotal connection of the two links at the same distance from the axes of the other two pivotal connections to the links, a connecting rod connecting the connected ends of the two links to the crank shaft, and means for adjusting said element to move the axis of its pivotal connection to one of said links from one side to the other of the path of movement of the pivotal connection between the other link and said member as the latter reciprocates.

6. In a mechanical movement, a crank shaft, an adjustable element, a reciprocating member, a pair of links pivotally connected one to said element and the other to said member and each to the other with the axis of the common pivotal connection of the two links at the same distance from the axes of the other two pivotal connections to the links, a connecting rod connecting the connected ends of the two links to the crank shaft, said element being adjustable to move the axis of its pivotal connection with one of said links transversely to the path of movement of the pivotal connection between the other link and said member as the latter reciprocates and means for connecting said element to and disconnecting it from said crank shaft to effect the adjustment of the element in either direction as desired.

7. In a mechanical movement the combination of a member constrained to move in a fixed path, a pair of links of the same length pivotally connected each at one end to the corresponding end of the other, a pivotal connection between the opposite end of one of said links and said member, an adjustable support to which the opposite end of the second link is pivotally connected and by which it may be adjusted into and away from the position in which said pivotal connection is coaxial with the connection between said second link and said support, and means for oscillating said second link about the axis of its pivotal connection to said support.

AUGUST J. MOTTLAU.

Witnesses:
    Arnold Katz,
    D. Stewart.